United States Patent
Huang et al.

(10) Patent No.: US 9,984,225 B2
(45) Date of Patent: May 29, 2018

(54) METHOD AND SYSTEM FOR PROVIDING TOKENLESS SECURE LOGIN BY VISUAL CRYPTOGRAPHY

(71) Applicant: EXCALIBUR IP, LLC, New York, NY (US)

(72) Inventors: Ling Wei Huang, Taipei (TW); Hsuan Ling Hsu, Kaohsiung (TW); Hsiu Ting Kao, Taichung (TW)

(73) Assignee: EXCALIBUR IP, LLC, New York, NY (US)

( * ) Notice: Subject to any disclaimer, the term of this patent is extended or adjusted under 35 U.S.C. 154(b) by 91 days.

(21) Appl. No.: 13/677,309

(22) Filed: Nov. 15, 2012

(65) Prior Publication Data

US 2014/0136836 A1 May 15, 2014

(51) Int. Cl.
  *H04L 9/32* (2006.01)
  *G06F 21/36* (2013.01)
  *G09C 5/00* (2006.01)
  *H04L 29/06* (2006.01)
  *H04W 12/06* (2009.01)

(52) U.S. Cl.
  CPC ............. *G06F 21/36* (2013.01); *G09C 5/00* (2013.01); *H04L 9/3226* (2013.01); *H04L 63/083* (2013.01); *H04W 12/06* (2013.01)

(58) Field of Classification Search
  CPC ... H04L 9/00; H04L 9/32; G06F 21/00; G06F 21/36; H04W 12/00; G09C 5/00
  See application file for complete search history.

(56) References Cited

U.S. PATENT DOCUMENTS

| | | | | |
|---|---|---|---|---|
| 5,428,349 A * | 6/1995 | Baker | ......................... | 340/5.54 |
| 6,209,104 B1 * | 3/2001 | Jalili | ............................... | 726/18 |
| 8,627,438 B1 * | 1/2014 | Bhimanaik | ....................... | 726/9 |
| 2005/0044395 A1 * | 2/2005 | Staring et al. | ............... | 713/200 |
| 2006/0227969 A1 * | 10/2006 | Johnson et al. | .............. | 380/210 |
| 2009/0328165 A1 * | 12/2009 | Cook | .................... | G06F 21/445 726/6 |
| 2013/0039484 A1 * | 2/2013 | Sun | ......................... | G06T 1/005 380/28 |
| 2013/0097684 A1 * | 4/2013 | Kim | ................................ | 726/7 |
| 2013/0097697 A1 * | 4/2013 | Zhu | .......................... | G06F 21/36 726/18 |
| 2013/0283397 A1 * | 10/2013 | Griffin | ........................... | 726/28 |

\* cited by examiner

*Primary Examiner* — Wasika Nipa
(74) *Attorney, Agent, or Firm* — James J. DeCarlo; Greenberg Traurig, LLP

(57) ABSTRACT

A method and system for providing tokenless secure login by visual cryptography. The method includes generating a password sequence and converting the password sequence to a password image. The method also includes encrypting the password image into a first image cipher and a second image cipher. The method further includes transmitting the first image cipher to a first electronic device of a user. Further, the method includes displaying the second image cipher on a second electronic device of the user. Moreover, the method includes enabling decryption of the password image by matching the first image cipher and the second image cipher using an image capture device on the first electronic device. The system includes a plurality of electronic devices, communication interface, memory, and processor.

16 Claims, 3 Drawing Sheets

METHOD AND SYSTEM FOR PROVIDING TOKENLESS SECURE LOGIN BY VISUAL CRYPTOGRAPHY

TECHNICAL FIELD

Embodiments of the disclosure relate to the field of providing tokenless secure login by visual cryptography.

BACKGROUND

Currently, certain websites require a secure login for a user. In one example, a token can be provided to the user. When the user needs to login to a related website, a one-time password generated on a token is used for the login. However, such tokens have a limited lifespan, occupy space and are also inextensible.

In light of the foregoing discussion, there is a need for a method and system for an efficient technique to provide tokenless secure login by visual cryptography.

SUMMARY

The above-mentioned needs are met by a method, a computer program product and a system for providing tokenless secure login by visual cryptography.

An example of a method of providing tokenless secure login by visual cryptography includes generating a password sequence and converting the password sequence to a password image. The method also includes encrypting the password image into a first image cipher and a second image cipher. The method further includes transmitting the first image cipher to a first electronic device of a user. Further, the method includes displaying the second image cipher on a second electronic device of the user. Moreover, the method includes enabling decryption of the password image by matching the first image cipher and the second image cipher using an image capture device on the first electronic device.

An example of a computer program product stored on a non-transitory computer-readable medium that when executed by a processor, performs a method of providing tokenless secure login by visual cryptography includes generating a password sequence and converting the password sequence to a password image. The computer program product also includes encrypting the password image into a first image cipher and a second image cipher. The computer program product further includes transmitting the first image cipher to a first electronic device of a user. Further, the computer program product includes displaying the second image cipher on a second electronic device of the user. Moreover, the computer program product includes enabling decryption of the password image by matching the first image cipher and the second image cipher using an image capture device on the first electronic device.

An example of a system for providing tokenless secure login by visual cryptography includes a plurality of electronic devices. The system also includes a communication interface in electronic communication with the plurality of electronic devices. The system further includes a memory that stores instructions, and a processor. The processor is responsive to the instructions to generate a password sequence and to convert the password sequence to a password image. The processor is also responsive to the instructions to encrypt the password image into a first image cipher and a second image cipher. The processor is further responsive to the instructions to transmit the first image cipher to a first electronic device of a user, to display the second image cipher on a second electronic device of the user, and to enable decryption of the password image by matching the first image cipher and the second image cipher using an image capture device on the first electronic device.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION OF THE EMBODIMENTS

The above-mentioned needs are met by a method, computer program product and system for providing tokenless secure login by visual cryptography. The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
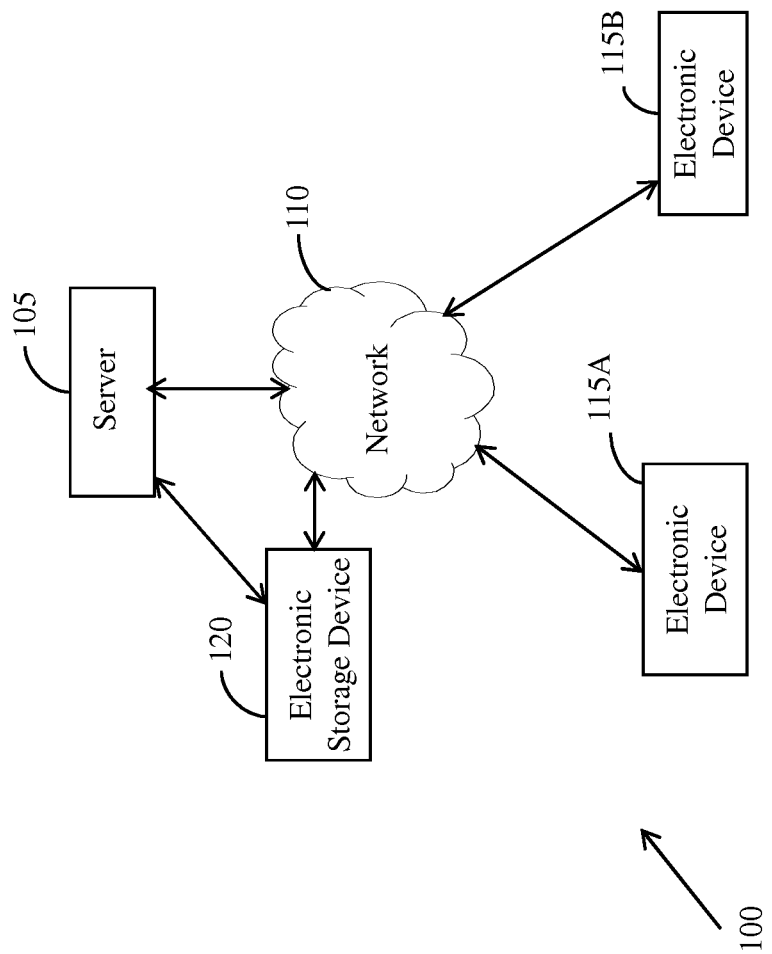
FIG. 1 is a block diagram of an environment, in accordance with which various embodiments can be implemented.

FIG. 1 is a block diagram of an environment 100, in accordance with which various embodiments can be implemented.

The environment 100 includes a server 105 connected to a network 110. The environment 100 further includes one or more electronic devices, for example an electronic device 115A and an electronic device 115B, which can communicate with each other through the network 110. Examples of the electronic devices include, but are not limited to, computers, mobile devices, tablets, laptops, palmtops, hand held devices, telecommunication devices, and personal digital assistants (PDAs).

The electronic devices can communicate with the server 105 through the network 110. Examples of the network 110 include, but are not limited to, a Local Area Network (LAN), a Wireless Local Area Network (WLAN), a Wide Area Network (WAN), internet, and a Small Area Network (SAN). The electronic devices associated with a user or different users can be remotely located with respect to the server 105.

The server 105 is also connected to an electronic storage device 120 directly or via the network 110 to store information, for example a password sequence, a password image, a first image cipher, and a second image cipher.

In some embodiments, different electronic storage devices are used for storing the information.

The server 105, for example a Yahoo!® server, generates a password sequence and further converts the password sequence to a password image. The server 105 then encrypts the password image into a first image cipher and a second image cipher. The server 105 transmits the first image cipher to a first electronic device of a user, for example the electronic device 115A, and displays the second image cipher on a second electronic device, for example the electronic device 115B, of the user. The server 105 further enables decryption of the password image by matching the first image cipher and the second image cipher using an image capture device on the first electronic device.

Figure 2:
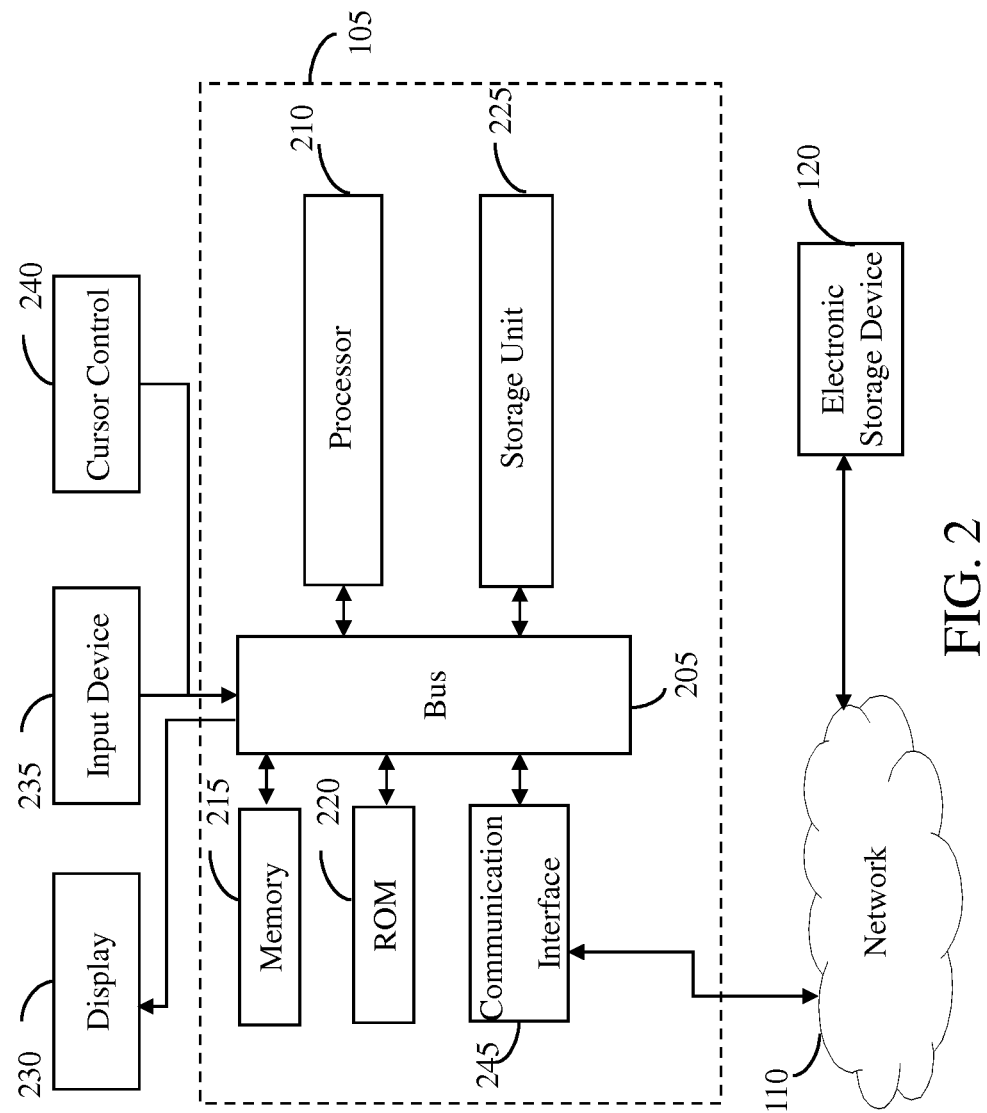
FIG. 2 is a block diagram of a server, in accordance with one embodiment.

The server 105 including a plurality of elements is explained in detail in conjunction with FIG. 2.

FIG. 2 is a block diagram of the server 105, in accordance with one embodiment. In some embodiments, the electronic device 115A and the electronic device 115B include elements similar to that of the server 105.

The server 105 includes a bus 205 or other communication mechanism for communicating information, and a processor 210 coupled with the bus 205 for processing information. The server 105 also includes a memory 215, for example a random access memory (RAM) or other dynamic storage device, coupled to the bus 205 for storing information and instructions to be executed by the processor 210. The memory 215 can be used for storing temporary variables or other intermediate information during execution of instructions by the processor 210. The server 105 further includes a read only memory (ROM) 220 or other static storage device coupled to the bus 205 for storing static information and instructions for the processor 210. A storage unit 225, for example a magnetic disk or optical disk, is provided and coupled to the bus 205 for storing information, for example a password sequence, a password image, a first image cipher, and a second image cipher.

The server 105 can be coupled via the bus 205 to a display 230, for example a cathode ray tube (CRT), and liquid crystal display (LCD) for displaying the password sequence and the password image. An input device 235, including alphanumeric and other keys, is coupled to the bus 205 for communicating information and command selections to the processor 210. Another type of user input device is a cursor control 240, for example a mouse, a trackball, or cursor direction keys for communicating direction information and command selections to the processor 210 and for controlling cursor movement on the display 230. The input device 235 can also be included in the display 230, for example a touch screen.

Various embodiments are related to the use of the server 105 for implementing the techniques described herein. In some embodiments, the techniques are performed by the server 105 in response to the processor 210 executing instructions included in the memory 215. Such instructions can be read into the memory 215 from another machine-readable medium, for example the storage unit 225. Execution of the instructions included in the memory 215 causes the processor 210 to perform the process steps described herein.

In some embodiments, the processor 210 can include one or more processing units for performing one or more functions of the processor 210. The processing units are hardware circuitry used in place of or in combination with software instructions to perform specified functions.

The term "machine-readable medium" as used herein refers to any medium that participates in providing data that causes a machine to perform a specific function. In an embodiment implemented using the server 105, various machine-readable media are involved, for example, in providing instructions to the processor 210 for execution. The machine-readable medium can be a storage medium, either volatile or non-volatile. A volatile medium includes, for example, dynamic memory, for example the memory 215. A non-volatile medium includes, for example, optical or magnetic disks, for example the storage unit 225. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic media, a CD-ROM, any other optical media, punchcards, papertape, any other physical media with patterns of holes, a RAM, a PROM, and EPROM, a FLASH-EPROM, any other memory chip or cartridge.

In another embodiment, the machine-readable media can be transmission media including coaxial cables, copper wire and fiber optics, including the wires that comprise the bus 205. Transmission media can also take the form of acoustic or light waves, such as those generated during radio-wave and infra-red data communications. Examples of machine-readable media may include, but are not limited to, a carrier wave as described hereinafter or any other media from which the server 105 can read, for example online software, download links, installation links, and online links. For example, the instructions can initially be carried on a magnetic disk of a remote computer. The remote computer can load the instructions into its dynamic memory and send the instructions over a telephone line using a modem. A modem local to the server 105 can receive the data on the telephone line and use an infra-red transmitter to convert the data to an infra-red signal. An infra-red detector can receive the data carried in the infra-red signal and appropriate circuitry can place the data on the bus 205. The bus 205 carries the data to the memory 215, from which the processor 210 retrieves and executes the instructions. The instructions received by the memory 215 can optionally be stored on the storage unit 225 either before or after execution by the processor 210. All such media must be tangible to enable the instructions carried by the media to be detected by a physical mechanism that reads the instructions into a machine.

The server 105 also includes a communication interface 245 coupled to the bus 205. The communication interface 245 provides a two-way data communication coupling to the network 110. For example, the communication interface 245 can be an integrated services digital network (ISDN) card or a modem to provide a data communication connection to a corresponding type of telephone line. As another example, the communication interface 245 can be a local area network (LAN) card to provide a data communication connection to a compatible LAN. Wireless links can also be implemented. In any such implementation, the communication interface 245 sends and receives electrical, electromagnetic or optical signals that carry digital data streams representing various types of information.

The server 105 is also connected to the electronic storage device 120 to store password sequence, the password image, the first image cipher, and the second image cipher.

The processor 210 in the server 105, for example a Yahoo!® server, generates a password sequence and further converts the password sequence to a password image. The processor 210 then encrypts the password image into a first image cipher and a second image cipher. The processor 210 transmits the first image cipher to a first electronic device of a user, for example the electronic device 115A, and displays the second image cipher on a second electronic device, for example the electronic device 115B, of the user. The processor 210 further enables decryption of the password image by matching the first image cipher and the second image cipher using an image capture device on the first electronic device.

Figure 3:
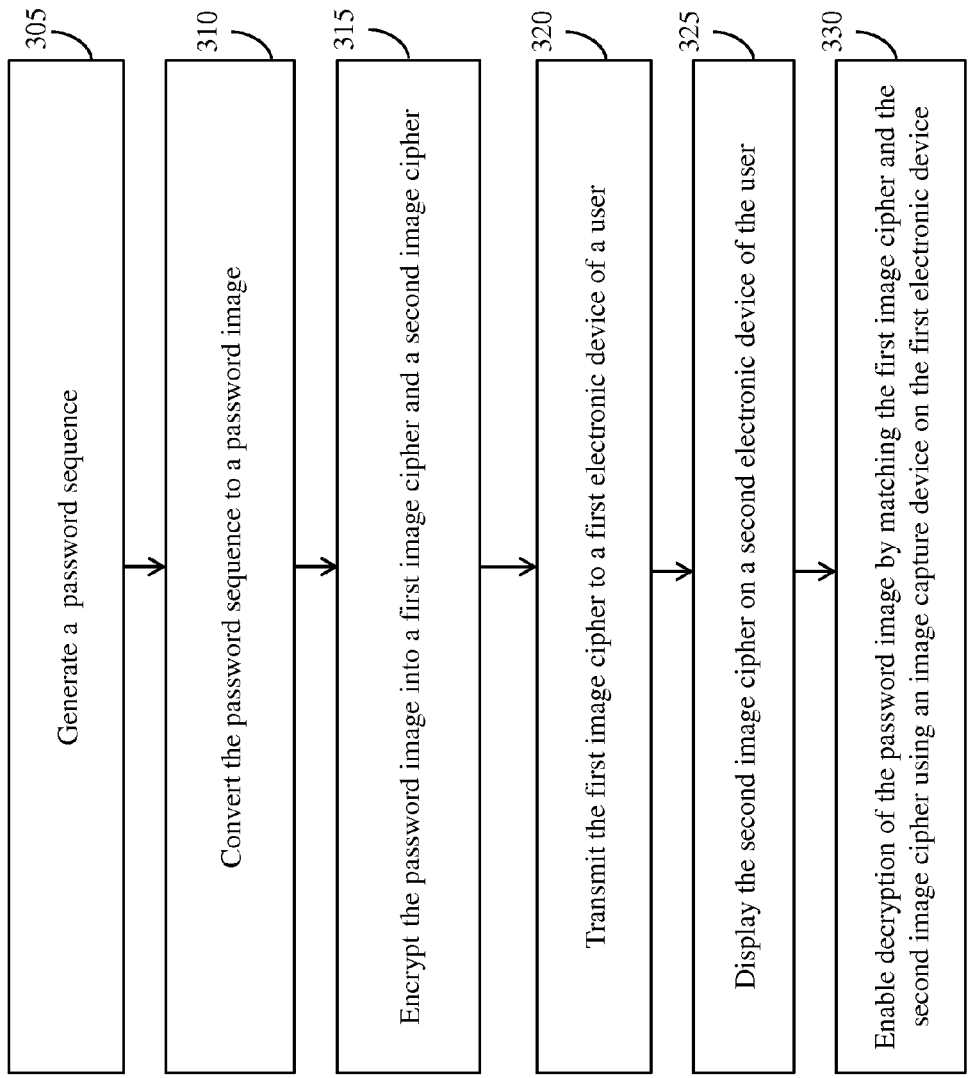
FIG. 3 is a flowchart illustrating a method of providing tokenless secure login by visual cryptography, in accordance with one embodiment.

FIG. 3 is a flowchart illustrating a method of providing tokenless secure login by visual cryptography, in accordance with one embodiment. Visual cryptography is defined as a technique that allows visual information to be encrypted such that decryption can be performed using human vision.

At step 305, a password sequence is generated. The password sequence is generated by a server, for example the server 105. In one example, the password sequence includes a plurality of numbers. In another example, the password sequence includes a plurality of numbers, characters and letters.

In some embodiments, the password sequence is generated using a one-time password theorem.

At step 310, the password sequence is converted to a password image. The password sequence can be converted to the password image using the server. The password image is a visual representation of the password sequence.

At step 315, the password image is encrypted into a first image cipher and a second image cipher. The password image is encrypted by the server using one or more visual cryptography algorithms.

At step 320, the first image cipher is transmitted to a first electronic device, for example the electronic device 115A, of a user. In one example, the first electronic device is a mobile device of the user.

At step 325, the second image cipher is displayed on a second electronic device, for example the electronic device 115B, of the user. In one example, the second electronic device is a personal computer of the user and the second image cipher is displayed on a web browser of the personal computer.

In some embodiments, the first image cipher and the second image cipher are transparent images that include the password image.

At step 330, decryption of the password image is enabled by matching the first image cipher and the second image cipher using an image capture device on the first electronic device. In one example, the image capture device is a camera on the mobile device. The first image cipher on the first electronic device is matched with the second image cipher on the second electronic device using an application and the image capture device on the first electronic device. The application can be downloaded or is inbuilt into the first electronic device. In one example, the application is a decryption application.

Using the application and the image capture device on the first electronic device, the password image that is decrypted can be further read by naked eye of the user.

In some embodiments, the password image that is decrypted can be provided as a captcha. The user can provide a response for the captcha. This ensures that the user is a human being and also provides another level of security.

In some embodiments, the password sequence, the password image, the first image cipher, and the second image cipher can be stored in an electronic storage device, for example the electronic storage device 120.

In other embodiments, the password sequence, the password image, the first image cipher, and the second image cipher can be stored in a storage unit, for example the storage unit 225, in a server, for example the server 105. In one example, the server can be a centralized server or a distributed server of Yahoo!®.

The present disclosure provides tokenless secure login by visual cryptography to prevent password leakage. The present disclosure hence enables discontinuation of distribution of tokens or similar hardware to users. Hence, the method and system in the present disclosure enables Yahoo! to provide security to online users.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:
1. A method comprising:
generating, by a server computing device, a password sequence, generation of the password sequence comprising using a one-time password theorem and selecting from a plurality of numbers, characters and letters to generate the password sequence;

converting, by the server computing device, the password sequence to a password image, the password image is a visual representation of the password sequence;

generating, by the server computing device, a first image cipher and a second image cipher by encrypting the password image, the first image cipher and the second image cipher include the password image and at least one of the first image cipher and the second image cipher is a transparent image;

transmitting, by the server computing device, the first image cipher to a first user device;

making, by the server computing device, the second image cipher available to a second user device for display of the second image cipher at the second user device, the first user device's image capture device capable of capturing a display of the second image cipher, and the second image cipher is made available to the second user device for enabling decryption of the password image of the password sequence for a tokenless secure login by matching a captured image of the second image cipher with the first image cipher, the decryption of the password image yielding the visual representation of the password sequence; and receiving, by the server computing device, the password sequence represented in the password image, decrypted using the first image cipher and the second image cipher, as input from a user in the tokenless secure login of the user.

2. The method as claimed in claim 1, wherein the password image is encrypted using one or more visual cryptography algorithms.

3. The method as claimed in claim 1, wherein an application made available to the first user device is for use in matching the first image cipher.

4. The method as claimed in claim 3, wherein the application is for further use in decrypting the password image in accordance with the matching of the transmitted first and second image ciphers.

5. The method as claimed in claim 4, wherein the application is for further use in enabling a decrypted password image to be displayed for the user.

6. A non-transitory computer-readable medium tangibly storing thereon instructions that when executed cause at least one processor to perform actions comprising:

generating a password sequence, generation of the password sequence comprising using a one-time password theorem selecting from a plurality of numbers, characters and letters to generate the password sequence;

converting the password sequence to a password image, the password image is a visual representation of the password sequence;

generating, by encrypting the password image, a first image cipher and a second image cipher, the first image cipher and the second image cipher include the password image and at least one of the first image cipher and the second image cipher is a transparent image;

transmitting the first image cipher to a first user device;

making the second image cipher available to a second user device for display of the second image cipher at the second user device, the first user device's image capture device capable of capturing a display of the second image cipher, and the second image cipher is made available to the second user device for enabling decryption of the password image of the password sequence for a tokenless secure login by matching a captured image of the second image cipher with the first image cipher, the decryption of the password image yielding the visual representation of the password sequence; and receiving the password sequence represented in the password image, decrypted using the first image cipher and the second image cipher, as input from a user in the tokenless secure login of the user.

7. The medium as claimed in claim 6, wherein the password image is encrypted using one or more visual cryptography algorithms.

8. The medium as claimed in claim 6, wherein an application made available to the first user device is for use in matching the first image cipher with the second image cipher.

9. The medium as claimed in claim 8, wherein the application is for further use in decrypting the password image in accordance with the matching of the transmitted first and second image ciphers.

10. The medium as claimed in claim 9, wherein the application is for further use in enabling a decrypted password image to be displayed for the user.

11. A system comprising:

at least one server computing device comprising one or more processors and a storage medium for tangibly storing thereon program logic for execution by the one or more processors, the stored program logic comprising:

generating logic executed by the one or more processors for generating a password sequence, generation of the password sequence comprising using a one-time password theorem selecting from a plurality of numbers, characters and letters to generate the password sequence;

converting logic executed by the one or more processors for converting the password sequence to a password image, the password image is a visual representation of the password sequence;

generating logic executed by the one or more processors for generating, by encrypting the password image, a first image cipher and a second image cipher, the first image cipher and the second image cipher include the password image and at least one of the first image cipher and the second image cipher is a transparent image;

transmitting logic executed by the one or more processors for transmitting the first image cipher to a first user device;

making available logic executed by the one or more processors for making the second image cipher available to a second user device for display of the second image cipher at the second user device, the first user device's image capture device capable of capturing a display of the second image cipher, and the second image cipher is made available to the second user device for enabling decryption of the password image of the password sequence for a tokenless secure login by matching a captured image of the second image cipher with the first image cipher, the decryption of the password image yielding the visual representation of the password sequence; and receiving logic executed by the one or more processors for receiving the password sequence represented in the password image, decrypted using the first image cipher and the second image cipher, as input from a user in the tokenless secure login of the user.

12. The system as claimed in claim 11, the program logic further comprising storing program logic for storing, on an electronic storage device, the password sequence, the password image, the first image cipher, and the second image cipher.

13. The system as claimed in claim 11, wherein the password image is encrypted using one or more visual cryptography algorithms.

14. The system as claimed in claim 11, wherein an application made available to the first user device is for use in matching the first image cipher.

15. The system as claimed in claim 11, wherein the application is for further use in decrypting the password image in accordance with the matching of the transmitted first and second image ciphers.

16. The system as claimed in claim 11, wherein application is for further use in enabling a decrypted password image to be displayed for the user.

\* \* \* \* \*